(No Model.)

N. ROSENBLATT & S. AHSCHARUMOFF.
ELASTIC WHEEL FOR CARRIAGES.

No. 603,154. Patented Apr. 26, 1898.

WITNESSES:
J. A. Brophy
A. Lurcott

INVENTORS
N. Rosenblatt
S. Ahscharumoff
BY
ATTORNEYS.

UNITED STATES PATENT OFFICE.

NICHOLAS ROSENBLATT AND SERGIUS AHSCHARUMOFF, OF ST. PETERSBURG, RUSSIA.

ELASTIC WHEEL FOR CARRIAGES.

SPECIFICATION forming part of Letters Patent No. 603,154, dated April 26, 1898.

Application filed July 6, 1897. Serial No. 643,588. (No model.)

*To all whom it may concern:*

Be it known that we, NICHOLAS ROSENBLATT and SERGIUS AHSCHARUMOFF, subjects of the Emperor of Russia, and residents of St. Petersburg, Russia, have invented certain new and useful Improvements in Elastic Wheels for Carriages, of which the following is a specification.

Our invention has for its object an elastic tire for wheels, which is free from the usual defects of this kind of tires—that is to say, they do not throw moisture and mud sidewise when driving. At the same time they possess all the advantages of the ordinary rubber tires.

Figure 1:
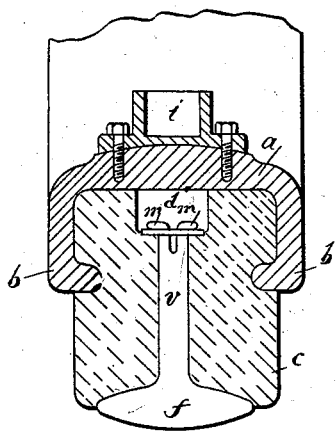
Figure 2:
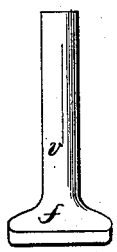
Figure 3:
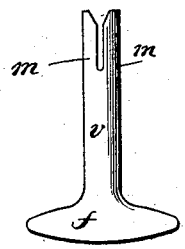
Figure 4:
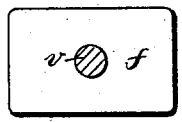
Figure 5:
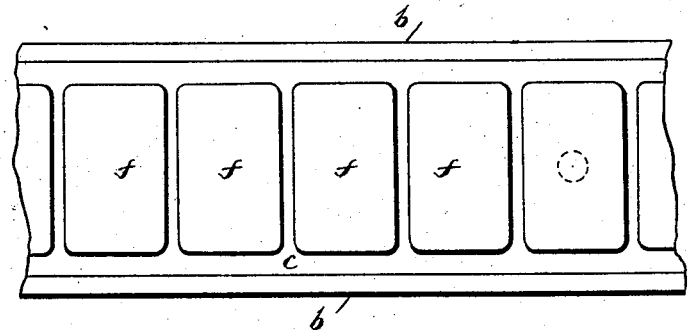

In the accompanying drawings, Figure 1 represents a vertical section of a part of a carriage-wheel provided with an elastic tire of our system. Figs. 2 and 3 are front and side views, respectively, of a metallic pin having a large head and forming part of the tire. Fig. 4 is a top view, partly in section, of the pin. Fig. 5 represents the tire in a flat or stretched position.

The metallic rim $a$ is of ordinary form and embraces with its sides $b$ the caoutchouc tire $c$, which differs from the ordinary caoutchouc tire by a groove $d$, provided on its inner surface. Through the whole thickness of the tire $c$ in the middle of it there are radial perforations equal in diameter to the external diameter of the pins $v$, which are inserted in these perforations. On the external surface of the tire $c$ are shallow cavities corresponding in form to the heads $f$ of the pins $v$.

The metallic pin $v$ is split on its upper (or inner) end and has a broad rectangular (with rounded edges) head $f$, the external surface of which is of a convex form and is beyond the surface of the tire $c$. The sides $m$ of the splitted end of the pin $v$ after it is inserted in the tire are bent outwardly upon an iron ring or follower placed in the groove $d$ of the tire.

Instead of making continuous groove $d$ we prefer to provide the tire $c$ on its inner surface with round holes concentric with the radial perforations and of sufficient diameter to locate the outwardly-bent ends of the pins $v$.

$i$ is a socket for the spoke of the wheel.

It will be seen that by this construction the caoutchouc (rubber) does not come into immediate contact with the ground when driving, and therefore does not throw the mud sidewise, as is the case with ordinary rubber tires.

We claim as our invention—

1. In a vehicle-wheel, a tire of flexible yielding material having a series of perforations extending through the tire, each of said perforations terminating in an enlarged recess on the inner side of the tire, and a series of metallic plates projecting from the periphery of the tire and having shank portions extending through the said perforations, each of said shank portions having its end secured in the enlarged recess, substantially as specified.

2. In a vehicle-wheel, a cushion-tire having a series of radial perforations terminating in enlarged recesses in the inner side of the tire, and metal plates of less width than the tire and projecting beyond the periphery thereof, the said plates being provided with shanks extending through the said perforations and into the said enlarged recesses in the inner side of the tire, the shanks having their ends split and adapted to be bent outwardly to engage plates seated in said recesses, substantially as specified.

3. An elastic tire for wheels, comprising a rubber tire having shallow cavities formed on its external surface, a series of radial perforations extending through the tire and terminating on the inner side of the tire in an enlarged recess, and pins having shank portions extending through the said perforations, each pin having its shank end split and extending through a metallic ring held in said enlarged recess, the said pins having enlarged heads shaped to correspond with the shallow cavities on the external surface of the tire, the outer surface of said heads being slightly convex and projecting beyond the external surface of the tire, the split ends of the shanks being bent upon the said rings, substantially as shown and described.

4. In a vehicle-wheel, the combination with a tire of flexible yielding material and a metallic rim embracing the sides of said tire, the tire being provided with a series of radial perforations each terminating on the peripheral surface of the tire in a shallow cavity and on the inner surface adjacent to the rim in an enlarged recess, of a series of metal pins provided with approximately rectangular heads the inner surface of which corresponds to the shallow cavities in the peripheral surface of the tire, the outer surface of said heads being convex and projecting beyond the periphery of the tire, but terminating short of the sides thereof, the shank portions of said pins extending through the perforations in the tire and the inner end of each shank portion being secured in the said enlarged recess, substantially as specified.

In testimony whereof we have signed our names to this specification in the presence of two subscribing witnesses.

NICHOLAS ROSENBLATT.
SERGIUS AHSCHARUMOFF.

Witnesses:
N. TSCHEKALUFF,
J. BLAU.